United States Patent
Yamaguchi

(10) Patent No.: US 10,097,732 B2
(45) Date of Patent: Oct. 9, 2018

(54) COLOR CONVERSION METHOD, NON-TRANSITORY RECORDING MEDIUM STORING COMPUTER READABLE PROGRAM, AND IMAGE PROCESSING APPARATUS

(71) Applicant: KONICA MINOLTA, INC., Chiyoda-ku, Tokyo (JP)

(72) Inventor: Takeshi Yamaguchi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/015,555

(22) Filed: Feb. 4, 2016

(65) Prior Publication Data

US 2016/0234402 A1    Aug. 11, 2016

(30) Foreign Application Priority Data

Feb. 9, 2015 (JP) ................. 2015-023504

(51) Int. Cl.
  *H04N 1/00* (2006.01)
  *H04N 1/60* (2006.01)
  *H04N 1/54* (2006.01)

(52) U.S. Cl.
  CPC ............. *H04N 1/6025* (2013.01); *H04N 1/54* (2013.01); *H04N 1/603* (2013.01); *H04N 1/6061* (2013.01)

(58) Field of Classification Search
  CPC .................................................. H04N 1/6025
  See application file for complete search history.

(56) References Cited

U.S. PATENT DOCUMENTS

| 2006/0007457 | A1* | 1/2006 | Namikata | ............ H04N 1/6033 358/1.9 |
| 2013/0136474 | A1 | 5/2013 | Itagaki | |
| 2015/0179135 | A1* | 6/2015 | Stauder | ............... H04N 1/6061 382/167 |

FOREIGN PATENT DOCUMENTS

| JP | 2002-372459 A | 12/2002 |
| JP | 2006-215808 A | 8/2006 |

* cited by examiner

*Primary Examiner* — King Poon
*Assistant Examiner* — Michael Burleson
(74) *Attorney, Agent, or Firm* — Buchanan Ingersoll & Rooney PC

(57) ABSTRACT

A color conversion method includes: a first acquisition step of acquiring a first color conversion table which defines mapping from a first color space to a second color space, and a second color conversion table which defines mapping from the second color space to a third color space; a second acquisition step of acquiring a color in the second color space to be subjected to color conversion; a computation step of computing an element group and a weight of each element included in the element group; a determination step of determining whether or not the element group in the second color conversion table; and a processing step of performing either first processing of performing inverse conversion and computing the color in the third color space, or second processing of performing an interpolation computation and computing the color in the third color space.

9 Claims, 11 Drawing Sheets

COLOR CONVERSION METHOD, NON-TRANSITORY RECORDING MEDIUM STORING COMPUTER READABLE PROGRAM, AND IMAGE PROCESSING APPARATUS

The entire disclosure of Japanese Patent Application No. 2015-023504 filed on Feb. 9, 2015 including description, claims, drawings, and abstract are incorporated herein by reference in its entirety.

BACKGROUND OF THE INVENTION

Field of the Invention

The present invention relates to a color conversion method, a program and an image processing apparatus, more particularly to a technique of converting color image information of an input system into color image information that falls within a color reproduction range of an output system when a color reproduction range of an input device differs from the color reproduction range of an output device.

Description of the Related Art

There is currently implemented a color management system (CMS) that realizes color matching among different devices such as a scanner, a display and a printer. Moreover, a color management system using a device profile is adapted to adjust an output color of a color printer (CMYK printer) to a desired color. Here, CMYK are the output colors of the color printer and indicate four colors including CMY being three fundamental colors (cyan, magenta and yellow) and K (black). A color conversion table (LUT: Look Up Table) is used to convert a certain CMYK value into a desired CMYK value. That is, a color conversion table used to convert a certain CMYK value into another CMYK value (such table will be hereinafter referred to as a "CMYK-CMYK color conversion table") needs to be created in advance.

The color conversion table (CMYK-CMYK color conversion table) recording desired color conversion to convert a certain CMYK value into another CMYK value is generally created by joining a CMYK-L*a*b* color conversion table of a target and an L*a*b*-CMYK color conversion table of an output device. A standard color space such as Japan Color is generally used as the target. Here, L*a*b* is a color system independent of a device where a value of the L*a*b* in the CMYK-L*a*b* color conversion table is a colorimetric value.

Now, when interpolation computation is performed to find a CMYK value from a certain L*a*b* value by using the L*a*b*-CMYK color conversion table of a printer, a point used in the interpolation computation is sometimes subjected to out-of-gamut mapping. Each of the devices such as the scanner, display and printer processing a color image has a device-specific range of colors that can be input or output, namely, a color gamut. In the interpolation computation involving the out-of-gamut mapping, for example, the point to be used in the interpolation that is based on the L*a*b* value (colorimetric value) before executing the out-of-gamut mapping is first mapped onto a surface of the color gamut (subjected to out-of-gamut mapping). Then, the point to be used in the interpolation that is based on the L*a*b* value before executing the out-of-gamut mapping is weighted, whereby the CMYK value is computed by multiplying the point obtained after the out-of-gamut mapping by the weight. Therefore, the CMYK value obtained after the interpolation computation equals a value toward the inner side of the color gamut relative to an original value due to the out-of-gamut mapping performed.

As a result, a color on the inner side of the color gamut surface (color gamut boundary) is used for a target color on the color gamut surface in the CMYK-CMYK color conversion table created in the end, so that the whole color gamut of the printer cannot be fully used in an effective manner.

FIG. 11 is a diagram illustrating an example of a color conversion method in the related art.

A color space (such as a Lab space) independent of a device is called a profile connection space (PCS). FIG. 11 illustrates a color gamut of a device where a point indicated with Δ is an input point to be subjected to color conversion while a point indicated with ○ is a point on a grid set in the PCS. An address on the PCS and a CMYK value corresponding to the address are described in each of grids G1 to G4.

When an interpolation computation using the grids G1 to G4 is performed on an input point In (color to be subjected to color conversion) in the PCS (such as L*a*b*) as illustrated in FIG. 11, the grids G1 and G2 outside the color gamut are mapped to grids G1' and G2' (indicated with □) on a color gamut surface by out-of-gamut mapping. The grids G3 and G4 stay at approximately the same positions after mapping. When the grids G1' and G2' obtained after the out-of-gamut mapping are used in the interpolation computation, the input point In is mapped not to a corresponding target color (target T) on the color gamut surface but to a color on the inner side of the color gamut surface (a point In' obtained after the interpolation computation) (a point indicated with ☆), whereby an error is generated with respect to the target T. As a result, the whole color gamut of the printer cannot be fully used in an effective manner. An error associated with color conversion performance is increased as well.

As a method of solving such problem, JP2006-215808 A discloses a technique of determining whether a "color to be subjected to color conversion", not a point cloud used in the interpolation computation, is inside or outside the color gamut and switching computation according to a result of the determination. This however causes interpolation accuracy to be decreased in a part of the area.

FIG. 12 is a diagram illustrating the technique described in JP 2006-215808 A as another example of the color conversion method employed in the related art.

As illustrated in FIG. 12, the technique described in JP 2006-215808 A is adapted to compare a point (grid) on the PCS with a polyhedron (polygon) on the color gamut surface to determine whether the point to be subjected to color conversion is inside or outside the color gamut and switch an interpolation method.

The technique described in JP 2006-215808 A determines whether the input point In is inside or outside the color gamut. Accordingly, as illustrated in FIG. 12, grids G1 and G2 are subjected to out-of-gamut mapping and mapped to grids G1' and G2' on the color gamut surface, when the input point In is inside the color gamut but the grids G1 and G2 used in the interpolation computation are outside the color gamut. Grids G3 and G4 stay at approximately the same positions after mapping. Then, as a result of the out-of-gamut mapping, the input point In is computed as a color (point In' obtained after interpolation computation) that is slightly on the inner side of a target color (target T), whereby an error is generated with respect to the target T. That is, the color gamut is reduced as described above when the color to be subjected to color conversion (input point In) is inside the color gamut while at the same time a color conversion table subjected to out-of-gamut mapping is referenced in the interpolation processing.

The aforementioned problem does not arise when out-of-gamut mapping computation is executed on all points (grids) used in the interpolation computation to compute the CMYK value. This however is not practical because of the amount of time required for computation. It is thus desired to perform only the interpolation computation without performing the out-of-gamut mapping computation on an area having no problem, in order to cut the computation time.

SUMMARY OF THE INVENTION

In consideration of the aforementioned situations, it is desired to realize a method that performs color conversion on the input point to be subjected to color conversion without losing the color gamut of an output device.

To achieve at least one of the abovementioned objects, according to an aspect, a color conversion method reflecting one aspect of the present invention comprises: a first acquisition step of acquiring a first color conversion table which defines mapping from a first color space to a second color space, and a second color conversion table which defines mapping from the second color space to a third color space of an output device; a second acquisition step of acquiring a color in the second color space to be subjected to color conversion from the first color conversion table; a computation step of computing an element group and a weight of each element included in the element group that are required to compute a color in the third color space of the output device corresponding to the color in the second color space acquired in the first acquisition step, the element group including as an element the color in the second color space in the second color conversion table; a determination step of determining whether or not the element group in the second color conversion table that is required to compute the color in the third color space of the output device corresponding to the color in the second color space is outside a color gamut of the output device; and a processing step of performing, according to a determination result obtained in the determination step, either first processing of performing inverse conversion by using the first color conversion table and computing the color in the third color space of the output device corresponding to the color in the second color space to be subjected to the color conversion, or second processing of performing an interpolation computation by using the element group and the weight of each element computed in the computation step and computing the color in the third color space of the output device corresponding to the color in the second color space to be subjected to the color conversion.

To achieve at least one of the abovementioned objects, according to an aspect, a non-transitory recording medium storing a computer readable program reflecting one aspect of the present invention causes a computer to execute the aforementioned color conversion method.

To achieve at least one of the abovementioned objects, according to an aspect, an image processing apparatus reflecting one aspect of the present invention comprises: a first color conversion table acquisition unit configured to acquire a first color conversion table which defines mapping from a first color space to a second color space; a second color conversion table acquisition unit configured to acquire a second color conversion table which defines mapping from the second color space to a third color space of an output device; an input point computation unit configured to acquire a color in the second color space to be subjected to color conversion from the first color conversion table; an interpolation-purpose element computation unit configured to compute an element group and a weight of each element included in the element group that are required to compute a color in the third color space of the output device corresponding to the color in the second color space acquired by the input point computation unit, the element group including as an element the color in the second color space in the second color conversion table; a color gamut determination unit configured to determine whether or not the element group in the second color conversion table that is required to compute the color in the third color space of the output device corresponding to the color in the second color space is outside a color gamut of the output device; a first processing unit configured to perform, according to a result of the determination, inverse conversion by using the first color conversion table and compute the color in the third color space of the output device corresponding to the color in the second color space to be subjected to the color conversion; a second processing unit configured to perform, according to the result of the determination, an interpolation computation by using the element group and the weight of each element and compute the color in the third color space of the output device corresponding to the color in the second color space to be subjected to the color conversion; and a color conversion table creation unit configured to create a color conversion table by associating the color in the third color space of the output device that is output from either the first processing unit or the second processing unit according to the result of the determination and corresponds to the color in the second color space to be subjected to the color conversion, and a color in the first color space that is acquired from the first color conversion table and corresponds to the color in the second color space to be subjected to the color conversion.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
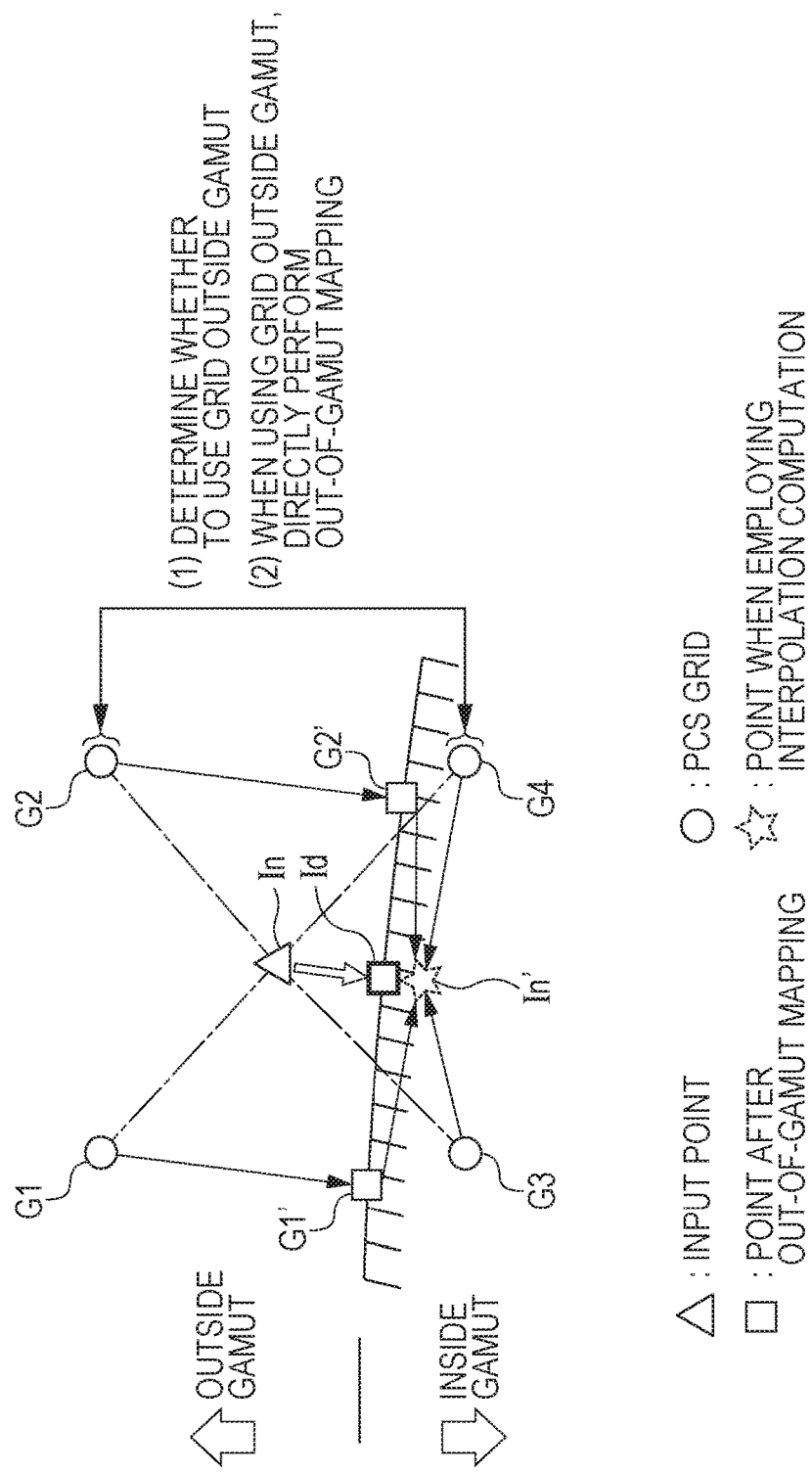
FIG. 1 is a diagram illustrating a color conversion method according to an embodiment of the present invention.

Hereinafter, an embodiment of the present invention will be described with reference to the drawings. However, the scope of the invention is not limited to the illustrated examples. Note that components that are identical or have the identical function are assigned the identical reference numeral in the following description and drawings to omit redundant description.

1. First Embodiment

[Concept of Color Conversion Method According to Present Disclosure]

The concept of a color conversion method according to an embodiment of the present invention will be described first with reference to FIG. 1.

Figure 11:
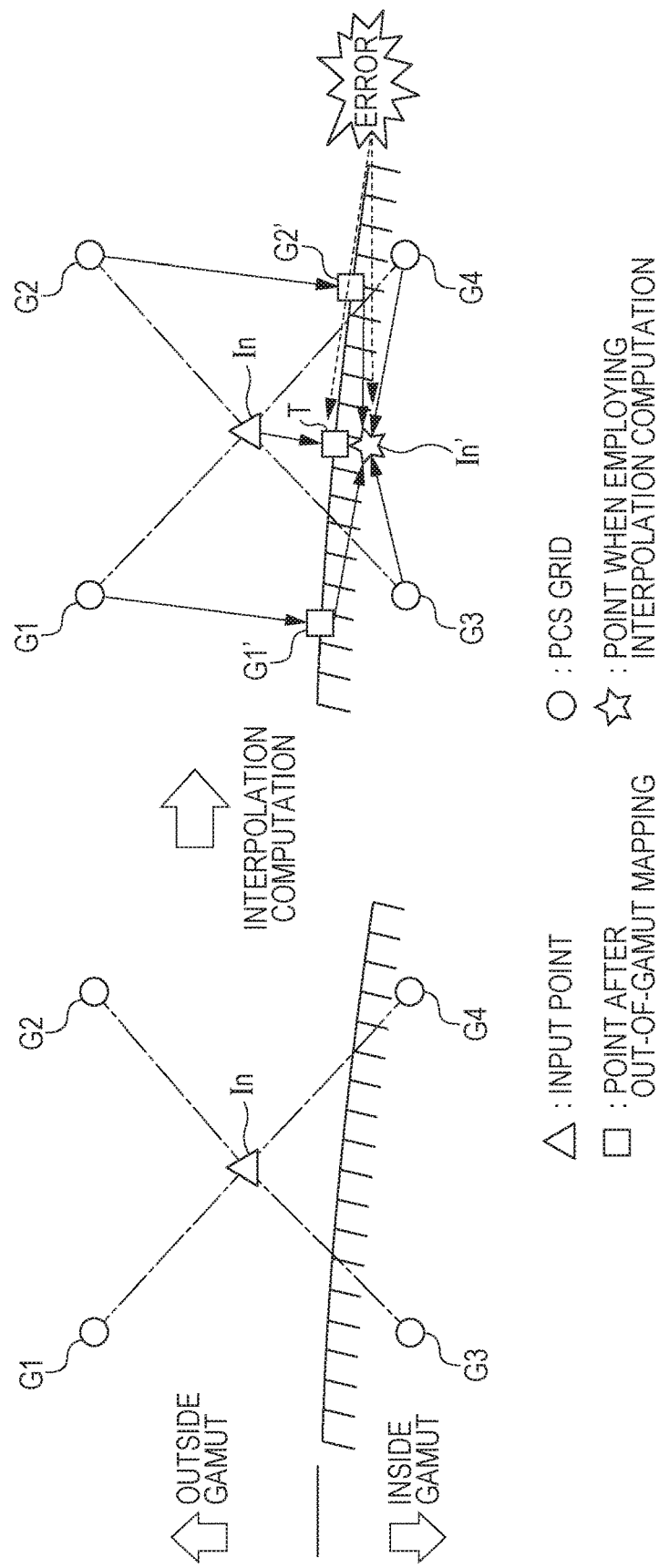
FIG. 11 is a diagram illustrating an example of a color conversion method in the related art.
Figure 12:
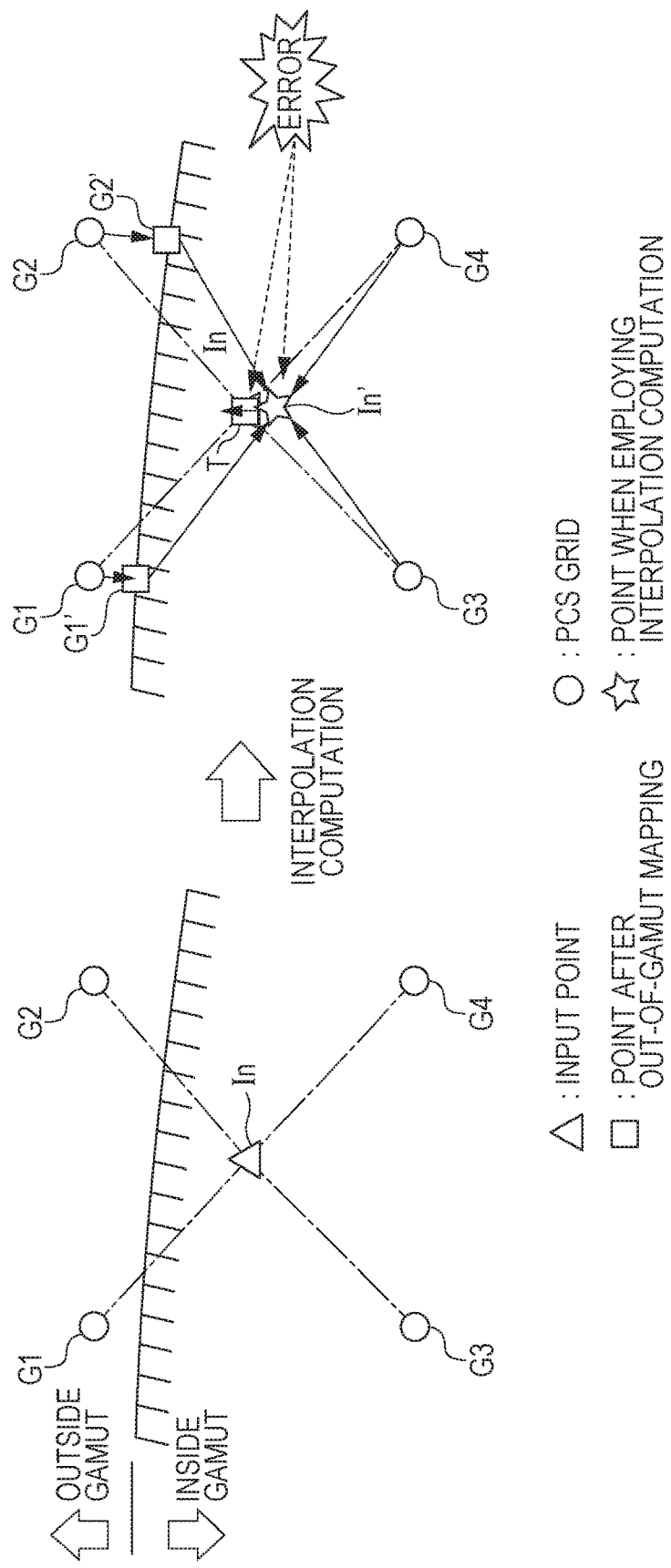
FIG. 12 is a diagram illustrating another example of the color conversion method in the related art.

FIG. 1 illustrates the concept of the color conversion method according to an embodiment of the present invention. A component in FIG. 1 that is identical to or has the same function as a component in FIGS. 11 and 12 is assigned the same reference numeral or symbol as that in FIGS. 11 and 12. Similar to FIGS. 11 and 12, in FIG. 1, a point indicated with Δ is an input point to be subjected to color conversion, a point indicated with ○ is a grid on a PCS, a point indicated with □ is a position of the grid on the PCS after subjected to out-of-gamut mapping, and a point indicated with a dashed ☆ is a point obtained when an interpolation computation is applied to the input point.

It is assumed in FIG. 1 that four grids G1 to G4 are present as candidates to be used in the interpolation computation for an input point In (color to be subjected to color conversion) on the PCS (such as L*a*b*). In the present embodiment, it is first determined whether or not to use the grids G1 and G2 outside a color gamut in the interpolation computation. When it is determined to use the grids G1 and G2 outside the color gamut, the input point In is directly subjected to out-of-gamut mapping with use of the grids G1 and G2 obtained after out-of-gamut mapping, so that an ideal point Id is found on a surface of the color gamut. In this case, a point In' (FIG. 11) found by using grids G1', G2', G3 and G4 (the grids G3 and G4 staying at approximately the same position after mapping) is not used.

Accordingly, when the grid outside the color gamut is used in the interpolation computation in the present embodiment, the ideal point Id can be reproduced by performing the computation directly with use of color characteristic information (such as a CMYK value) of a device such as a printer without using a color conversion table, whereby a loss (reduction) in the color gamut can be prevented. Such direct computation may be executed by the same method as that employed in performing out-of-gamut mapping on the grid used in the interpolation computation, for example. Note that a point on the surface of the color gamut (color gamut boundary surface) is assumed to be included in the color gamut.

[Image Forming System]

An image forming system 10 (color adjustment system) according to an embodiment of the present invention will be described with reference to FIGS. 2 to 4.

Figure 2:
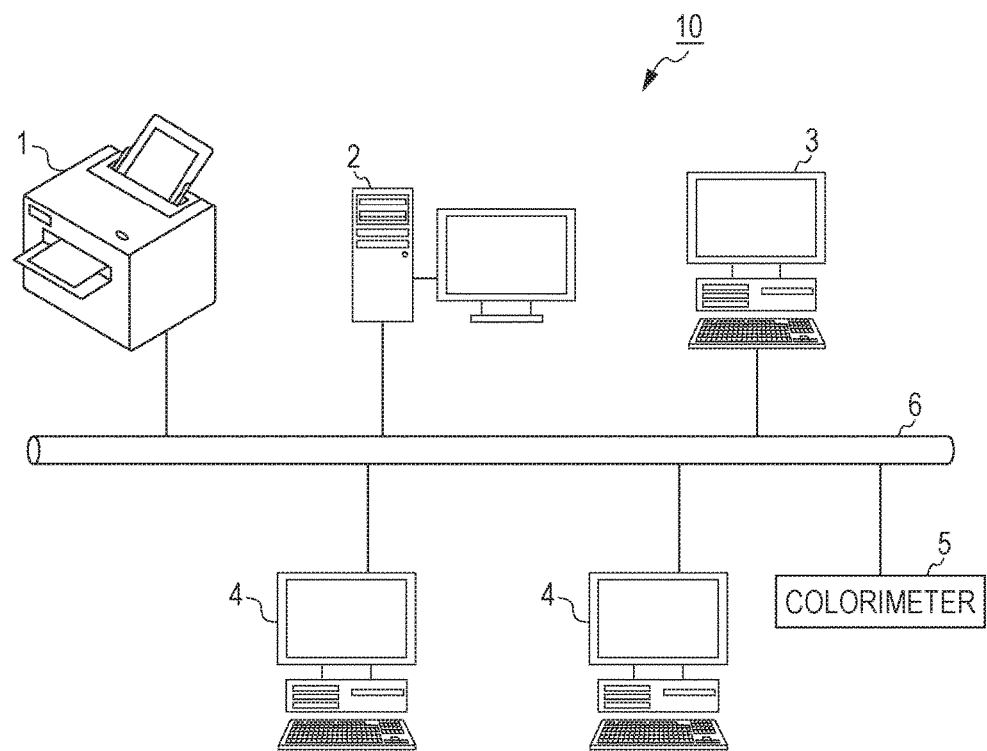
FIG. 2 is a diagram illustrating a system configuration of an image forming system according to an embodiment of the present invention.

FIG. 2 illustrates a system configuration of the image forming system 10 according to the present invention.

The image forming system 10 includes a printer 1, a controller 2, a color conversion table creation device 3, a print instruction terminal 4, and a colorimeter 5. A network 6 is a communication line such as a LAN (Local Area Network) in conformity with a standard such as Ethernet (registered trademark). These units are connected to be able to communicate with one another through the network 6.

The printer 1 (an example of an image forming apparatus) outputs image data in CMYK colors including CMY (cyan, magenta, and yellow) being three fundamental colors and K (black) that have mutually different hues. The printer 1 is connected to the controller 2 through a communication interface to receive a print job (image data) from the controller 2, form an image on a sheet of paper, and output the paper (perform printing).

The controller 2 acquires a print job from the print instruction terminal 4 connected through the network 6. The controller 2 then performs processing such as color conversion, screening and rasterizing on the acquired print job and transfers image data to the printer 1. The rasterizing (RIP: Raster Image Processor) is performed to generate the image data of a raster image used in image formation. The color conversion is performed by using a color conversion table (LUT) created by the color conversion table creation device 3. The controller 2 may also be built into the printer 1. Moreover, the printer 1 and the controller 2 are connected to each other by a dedicated line (such as PCI bus connection) in some cases.

The color conversion table creation device 3 (an example of an image processing apparatus) uses a color chart output from the printer 1 to create the color conversion table. The color conversion table creation device 3 may also be built into the controller 2 or the printer 1. The color chart is stored in advance in a storage unit 3f or the like (to be described). The color chart is a general color chart in conformity with a predetermined standard.

The print instruction terminal 4 uses a printer driver or a dedicated software and issues the print job by sending a print instruction to the controller 2 in response to an input operation by a user. A general-purpose computer such as a PC (Personal Computer) is used as the print instruction terminal 4.

The colorimeter 5 measures the color chart output from the printer 1. Moreover, the colorimeter 5 is connected to the color conversion table creation device 3 and the print instruction terminal 4 through the network 6.

Specifically, the colorimeter 5 performs spectroscopic measurement on a color of each color patch included in the color chart. The colorimeter 5 then transmits a colorimetric value of the measured color to the color conversion table creation device 3. Here, the colorimetric value measured by the colorimeter 5 is expressed by a spectral reflectance value or a value in a device-independent color system such as XYZ and L*a*b* specified by International Commission on Illumination (CIE).

Note that when the colorimetric value measured by the colorimeter 5 is expressed by the spectral reflectance value or the XYZ value, the color conversion table creation device 3 may be configured to convert the colorimetric value into an L*a*b* value or a value of a CIE CAM 02.

In the present embodiment, there will be described a case where the L*a*b* value is used as the colorimetric value measured by the colorimeter 5.

The controller 2 stores the color conversion table (device link profile) transmitted from the print instruction terminal 4 into a storage device such as an HDD. The controller 2 can perform color conversion processing on the generated image data by using the device link profile. The controller 2 transmits the image data on which the color conversion processing is performed or not performed to the printer 1, which then outputs the data.

[Color Conversion Table]

The color conversion table will now be described with reference to FIGS. 3 and 4.

The aforementioned profile refers to the color conversion table. An ICC profile among other profiles is widely used in not only a printing industry but also an IT (Information Technology) industry and is a de facto standard. The ICC profile will be described below as an example. Color management performed by using the ICC profile is roughly classified into two methods as follows.

Method using a device profile (hereinafter denoted as a "DP")

Method using a device link profile (hereinafter denoted as a "DLP")

(when Using Device Profile (DP))

The DP is a profile in which a device value (such as CMYK value and RGB value) being a machine-dependent value is associated with a machine-independent value (such as the XYZ value or L*a*b* value). The DP is formed of a LUT used to convert the device value into the machine-independent value and a LUT used to convert the machine-independent value into the device value. The DP of a CMYK printer is formed of a LUT (A2B table: an example of a first color conversion table) used to convert CMYK (first color space) into L*a*b* (second color space) and a LUT (B2A table: an example of a second color conversion table) used to convert the L*a*b* (second color space) into CMYK (third color space), for example. The machine-independent value is a color space connecting profiles and is thus referred to as a profile connection space (PCS).

Note that in the DP, a rendering intent can be selected depending on a different color reproduction policy. Types of the rendering intent include perceptual, colorimetric and saturation, for example, where a LUT is provided for each type. In this case, the DP has LUTs for three types. One of the rendering intents is selected at the time of color conversion, and the LUT connected to the selected rendering intent is used.

A DP of a target device required in the color conversion is called a source profile (sometimes called a target profile). A profile of an offset printing machine or a standard profile such as Japan Color is selected as the source profile, for example. On the other hand, a DP of an output device is called a destination profile (sometimes called a printer profile). In this case, a profile of a printer (such as the printer 1) that actually outputs a printed matter is selected. An input CMYK value is converted into a machine-independent value through the A2B table of the source profile and then converted into another CMYK value through the B2A table of the destination profile.

Figure 3:
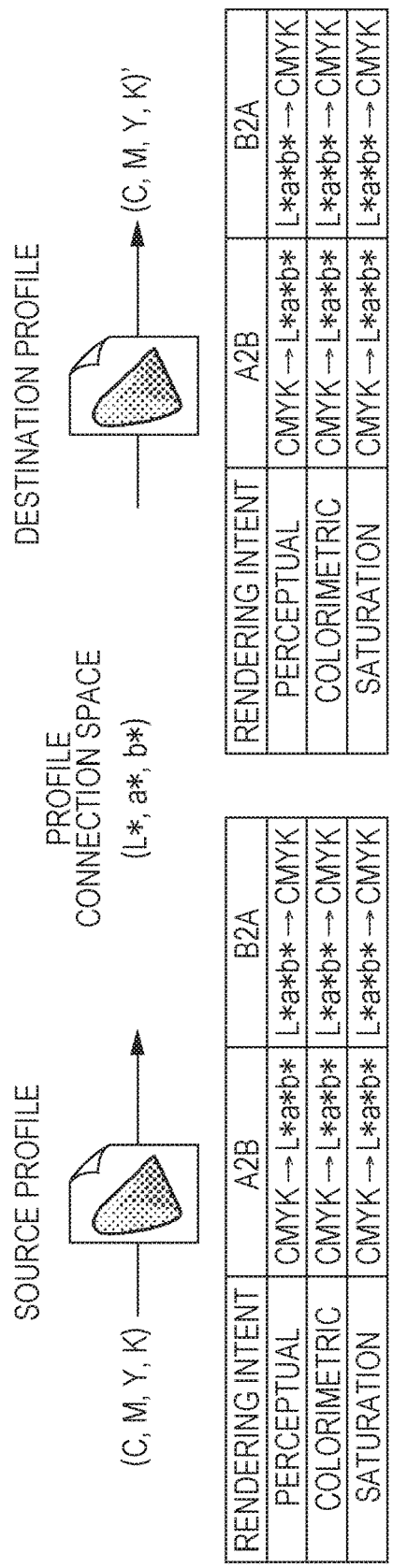
FIG. 3 is a diagram illustrating the flow of color conversion processing using a device profile.

FIG. 3 is a diagram illustrating the flow of the color conversion processing using the device profile.

The processing goes through the two-step conversion as described above to allow the printer (destination) to output a CMYK value (C, M, Y, K)' corresponding to the CMYK value (C, M, Y, K) of the target device (source).

(When Using Device Link Profile (DLP))

The DLP is a profile in which information used in the aforementioned color conversion processes using the DP, namely the conversion of the device value→the machine-independent value→the device value, is put together in one LUT. In other words, the DLP is a LUT in which an input device value is associated with an output device value. The DLP is created by integrating a device profile (source profile) of an input device and a device profile (destination profile) of an output device (such as the printer 1). Color conversion processing involved in the color management need only be performed once when the DLP is used in the color conversion. When CMYK (first color space) of a certain device is converted into CMYK (third color space) of another device, for example, conversion into a device-independent color space (such as three-dimensional L*a*b*) is not required so that a loss of information (such as when one wishes to keep information on black print) is reduced.

Figure 4:
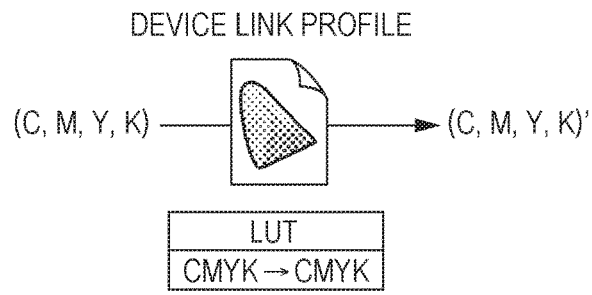
FIG. 4 is a diagram illustrating the flow of color conversion processing using a device link profile.

FIG. 4 is a diagram illustrating the flow of the color conversion processing using the device link profile.

The DLP does not involve the concept of the rendering intent but only has one LUT. Accordingly, a target CMYK value (C, M, Y, K)' can be output directly by applying the LUT of the device link profile to an input CMYK value (C, M, Y, K).

(Example of Hardware Configuration of Color Conversion Table Creation Device)

Figure 5:
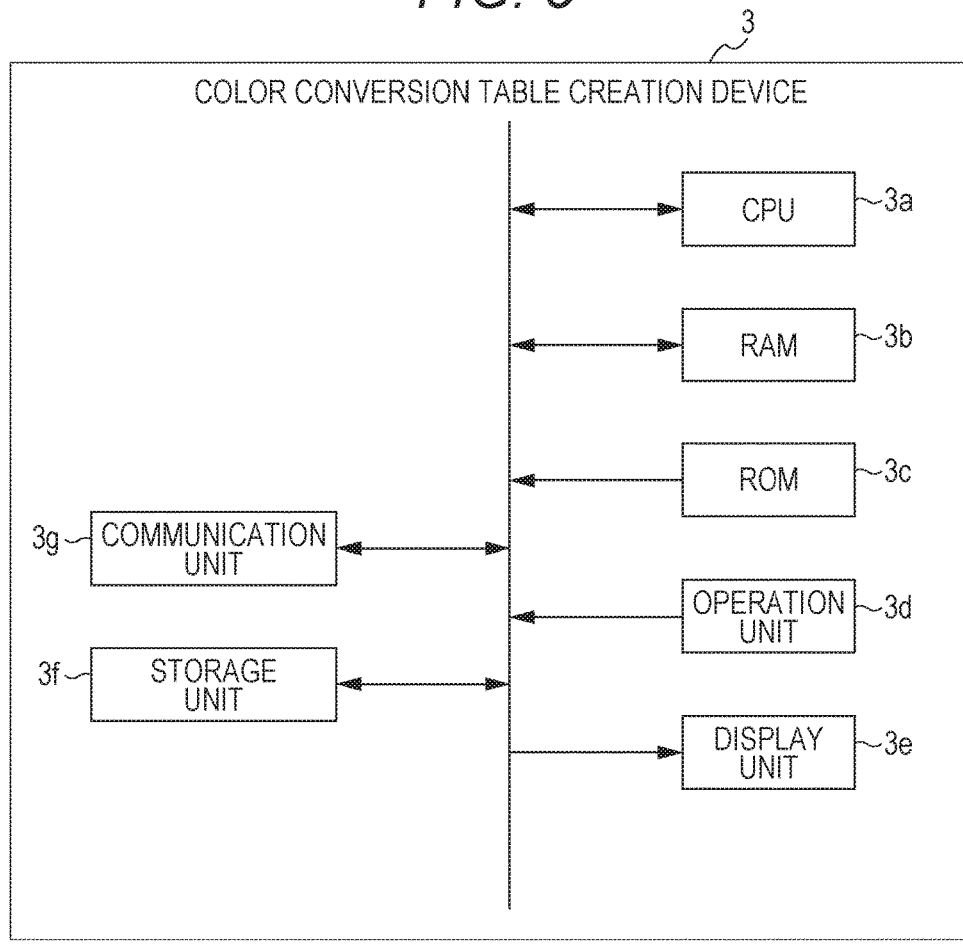
FIG. 5 is a block diagram illustrating an example of a hardware configuration of a color conversion table creation device illustrated in FIG. 2.

FIG. 5 is a block diagram illustrating an example of a hardware configuration of the color conversion table creation device 3.

A PC (Personal Computer) or the like is used as the color conversion table creation device 3. The color conversion table creation device 3 includes a CPU (Central Processing Unit) 3a, a RAM (Random Access Memory) 3b, a ROM (Read Only Memory) 3c, an operation unit 3d, a display unit 3e, the storage unit 3f, and a communication unit 3g.

The CPU 3a executes various programs (program codes) stored in the ROM 3c in response to an input signal input from each unit of the print instruction terminal 4. The CPU 3a also outputs an output signal to each unit on the basis of the executed program and exercises control over the whole operation of the print instruction terminal 4.

Moreover, the CPU 3a creates the color conversion table used to allow the printer 1 to convert (adjust) a color of image data input to the printer 1 into/to a desired color. The CPU 3a for example creates a printer profile (destination profile) of the printer 1. The CPU 3a further creates a device link profile by using the printer profile of the printer 1 and a source profile (target profile).

The RAM 3b forms a work area in which the various programs executed by the CPU 3a as well as data associated with the programs are stored temporarily.

The ROM 3c is formed of a non-volatile semiconductor memory or the like. The ROM 3c is a medium storing the various programs executed by the CPU 3a in the form of a program code that can be read by the CPU 3a. The ROM 3c also stores a parameter and a file required by the CPU 3a in executing the programs.

The operation unit 3d includes a keyboard including a cursor key, a character input key and various function keys as well as a pointing device such as a mouse. The operation unit 3d accepts operational input from a user and then outputs an operation signal corresponding to the operation to the CPU 3a.

The display unit 3e is formed of an LCD (Liquid Crystal Display) or the like. The display unit 3e displays various operation screens and various processing results according to an instruction from the CPU 3a.

The storage unit 3f is the storage device such as the HDD (Hard Disk Drive). The storage unit 3f stores the printer profile of the printer 1 and the device link profile that are created by the CPU 3a.

The storage unit 3f further stores a device profile of the standard color space such as Japan Color as a source profile. Note that the storage unit 3f may also store a device profile of a color monitor as a source profile.

The communication unit 3g is a communication interface that connects the color conversion table creation device 3 to the controller 2 and the colorimeter 5. The communication unit 3g is then used to transmit/receive data to/from the controller 2 and the colorimeter 5.

The communication unit 3g receives a colorimetric value of the color chart transmitted from the colorimeter 5, for example. Moreover, the communication unit 3g transmits the source profile and the device link profile stored in the storage unit 3f to the controller 2.

(Example of Internal Configuration Representing Function of Color Conversion Table Creation Device)

Figure 6:
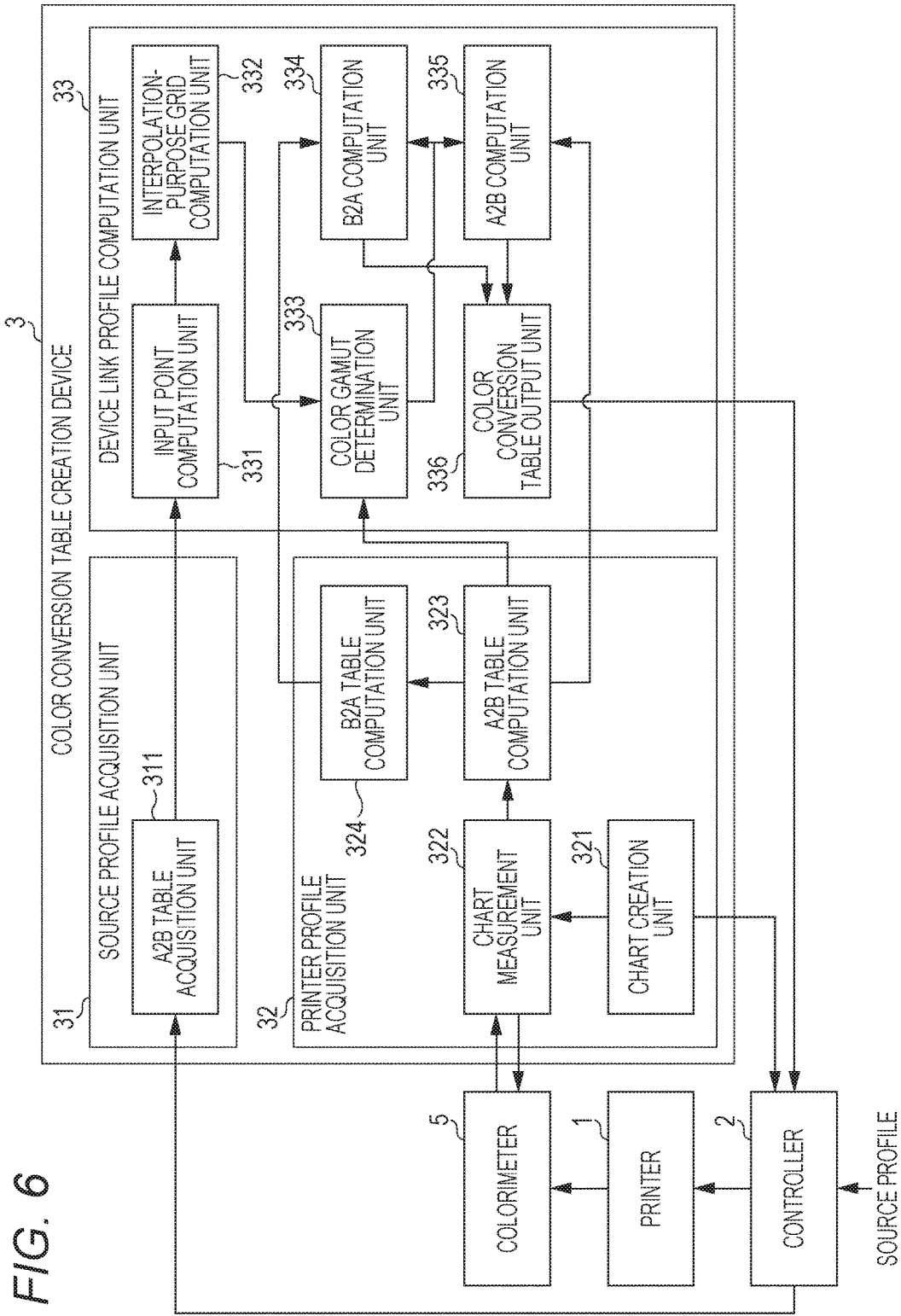
FIG. 6 is a block diagram illustrating a function implemented by the color conversion table creation device illustrated in FIG. 2.

FIG. 6 is a block diagram illustrating a function implemented by the color conversion table creation device 3. The function of each unit illustrated in FIG. 6 is implemented when the CPU 3a executes the program read from the ROM 3c.

The color conversion table creation device 3 includes a source profile acquisition unit 31, a printer profile acquisition unit 32, and a device link profile computation unit 33.

The source profile acquisition unit 31 (an example of a first color conversion table acquisition unit) will be described first.

The source profile acquisition unit 31 includes an A2B table acquisition unit 311 that acquires the A2B table. The A2B table acquisition unit 311 acquires color information (such as an A2B table of a data profile) of a target device (such as a color-matching printer) or the standard color as a source profile from the controller 2 The A2B table (refer to FIG. 3) being the source profile is an example of the first color conversion table. Note that when the source profile is stored in the storage unit 3f in advance, the A2B table acquisition unit 311 may acquire the source profile by reading it from the storage unit 3f.

Next, the printer profile acquisition unit 32 (an example of a second color conversion table acquisition unit) will be described.

The printer profile acquisition unit 32 includes a chart creation unit 321, a chart measurement unit 322, an A2B table computation unit 323, and a B2A table computation unit 324.

The chart creation unit 321 creates chart data to be used to create a printer profile and gives an output instruction to the controller 2.

The chart measurement unit 322 controls the colorimeter 5 to cause the colorimeter 5 to measure a color chart that is output from the printer 1 on the basis of the chart data. The chart measurement unit 322 then acquires data (colorimetric data) on the color chart output from the colorimeter 5.

The A2B table computation unit 323 creates the A2B table (refer to FIG. 3) by performing an interpolation operation on the basis of the colorimetric data output from the chart measurement unit 322 and computing a colorimetric value (L*a*b* value) for the entire color gamut (CMYK space) of the printer 1. The A2B table is output to the B2A table computation unit 324, a color gamut determination unit 333 and an A2B computation unit 335 as well as stored in the storage unit 3f.

On the basis of the A2B table created by the A2B table computation unit 323, the B2A table computation unit 324 creates the B2A table (refer to FIG. 3) by computing a device value (combination of CMYK values) of the printer 1 for the entire color space of the colorimetric value (L*a*b* value). The B2A table is an example of the second color conversion table and is output to a B2A computation unit 334 as well as stored in the storage unit 3f.

The device link profile computation unit 33 will now be described.

The device link profile computation unit 33 includes an input point computation unit 331, an interpolation-purpose grid computation unit 332, the color gamut determination unit 333, the B2A computation unit 334, the A2B computation unit 335, and a color conversion table output unit 336.

The input point computation unit 331 uses the A2B table created by the A2B table computation unit 323 to compute a target colorimetric value (L*a*b* value) from a device value (combination of CMYK values) being an input point of a device link profile, and outputs the target colorimetric value to the interpolation-purpose grid computation unit 332. The A2B table input to the input point computation unit 331 is acquired from the controller 2 by the input point computation unit 331 on the basis of the source profile input to the controller 2.

The interpolation-purpose grid computation unit 332 (an example of an interpolation-purpose element computation unit) performs computation, for the target colorimetric value (L*a*b* value) input from the input point computation unit 331 and subjected to computation, to find a colorimetric value of a grid group as well as a weight of each grid that are used by the B2A computation unit 334 in computing a device value (combination of CMYK values).

The grid group (an example of an element group) is formed of grid points on a surface of a cube in the PCS. The grid group includes as elements grid points corresponding to a plurality of colorimetric values (L*a*b* values) in the L*a*b*-CMYK color conversion table of a device (the printer 1) that is required in calculating the device value (CMYK value) from the colorimetric value (L*a*b* value) acquired by using the colorimeter 5.

The interpolation-purpose grid computation unit 332 performs computation for all the target colorimetric values input from the input point computation unit 331 to compute the colorimetric value and weight of the grid group to be used in computing the device value. The weight of each grid for the target colorimetric value subjected to computation is computed according to a distance between the target colorimetric value and each grid included in the grid group.

The color gamut determination unit 333 uses the A2B table of the printer 1 created by the A2B table computation unit 323 and determines whether or not the colorimetric value of the grid group acquired by the interpolation-purpose grid computation unit 332 is outside the color gamut of the printer 1. Note that the color gamut determination unit 333 may also perform determination on the colorimetric value by using color gamut information called a gamut tag of the printer profile (information describing whether each input point in the A2B table is inside or outside the color gamut).

The B2A computation unit 334 (an example of a second processing unit) uses the B2A table created by the B2A table computation unit 324 to perform an interpolation computation on the basis of the colorimetric value and weight of the grid group computed by the interpolation-purpose grid computation unit 332, and acquires the CMYK value of the printer 1 as the device value.

The A2B computation unit 335 (an example of a first processing unit) performs out-of-gamut mapping as needed by using the colorimetric value output from the input point computation unit 331 and the A2B table of the printer 1 computed by the A2B table computation unit 323, and acquires the CMYK value of the printer 1 as the device value.

The color conversion table output unit 336 (an example of a color conversion table creation unit) computes a color conversion table (device link profile) on the basis of the device value (CMYK value) output from each of the B2A computation unit 334 and the A2B computation unit 335. The created color conversion table is saved in the storage unit 3f as well as transmitted to the controller 2.

That is, the color conversion table output unit 336 acquires the device value (CMYK value) of the output device (printer 1) corresponding to the colorimetric value (L*a*b* value) subjected to color conversion and output from either the B2A computation unit 334 or the A2B computation unit 335, according to the determination result of the color gamut determination unit 333. Then, the color conversion table (device link profile) is created by associating the acquired device value with the device value corresponding to the colorimetric value to be subjected to color conversion that is read from the A2B table (CMYK-L*a*b* color conversion table (a)) of the source profile acquired by the A2B table acquisition unit 311.

[Color Conversion Processing]

Next, color conversion processing executed by the color conversion table creation device 3 in the process of creating a color conversion creation table will be described with reference to FIG. 7. The processing illustrated in FIG. 7 is implemented when the CPU 3a of the color conversion table creation device 3 reads a program from the ROM 3c and executes the program.

Figure 7:
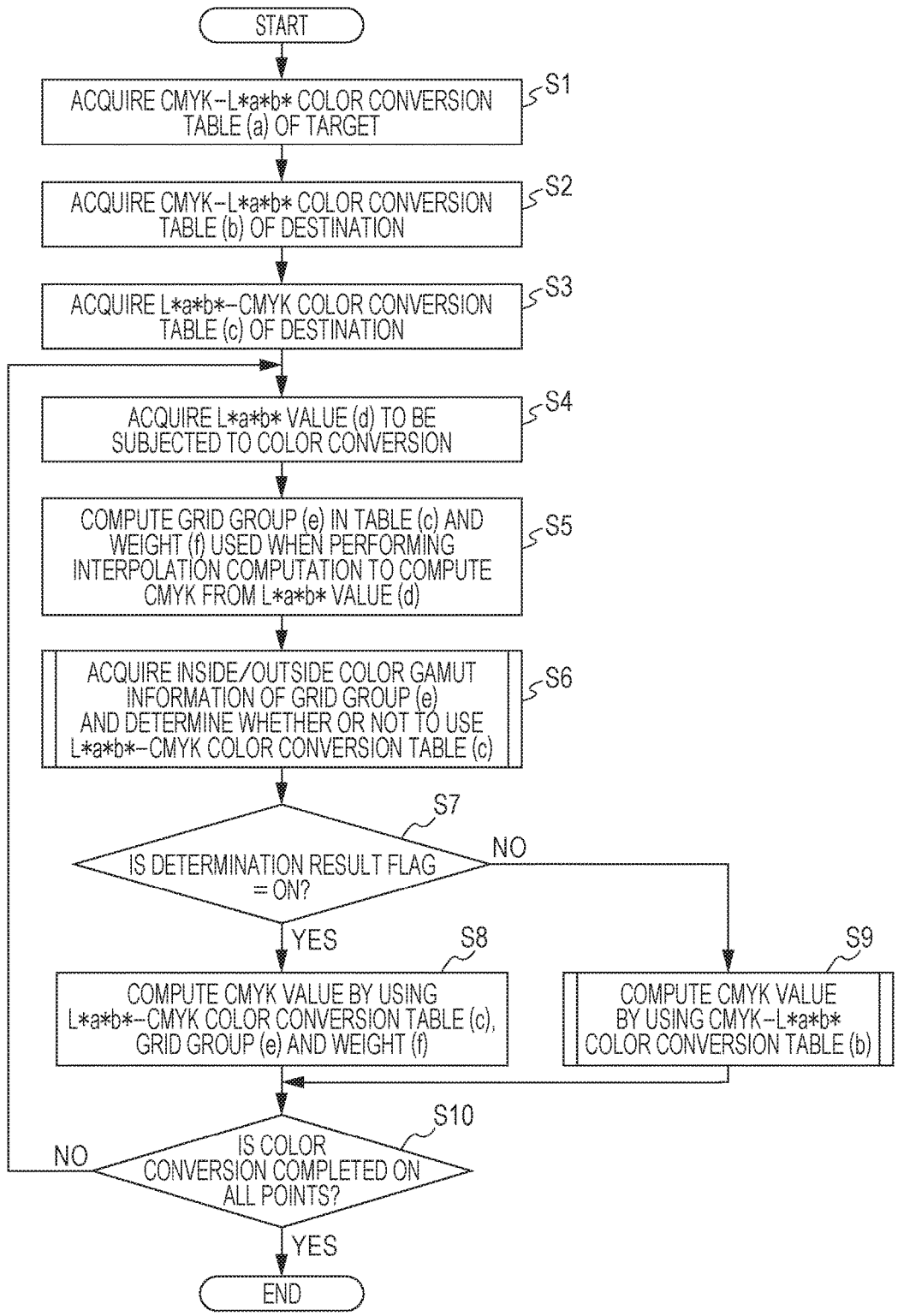
FIG. 7 is a main flowchart illustrating color conversion processing according to an embodiment of the present invention.

FIG. 7 is a main flowchart illustrating the color conversion processing performed by the color conversion table creation device 3.

First, the A2B table acquisition unit 311 of the source profile acquisition unit 31 acquires the CMYK-L*a*b* color conversion table (a) of a target as the source profile (S1).

That is, the A2B table acquisition unit 311 acquires a color conversion table in which a colorimetric value (L*a*b* value) is associated with a device value (CMYK value) of a printer (such as another printer, an offset printing machine or standard color (Japan Color) printer) being the color matching target. The source profile acquisition unit 31 (A2B table acquisition unit 311) may refer to the A2B table of the target profile to acquire such table. The A2B table includes color values of 94 colors or 114 colors generated by combinations of CMYK, for example.

Next, the A2B table computation unit 323 acquires a CMYK-L*a*b* color conversion table (b) of a destination (S2).

That is, the A2B table computation unit 323 acquires a color conversion table in which a colorimetric value (L*a*b* value) is associated with the device value (CMYK value) of the printer 1 to be subjected to color conversion. The A2B table computation unit 323 may refer to the A2B table of the printer profile stored in the storage unit 3f to acquire such table.

When the printer profile does not exist in the storage unit 3f, the A2B table computation unit 323 creates the A2B table by performing the interpolation computation with use of colorimetric data generated by the colorimeter 5 on the basis of the color chart output from the printer 1.

Next, the B2A table computation unit 324 acquires a L*a*b*-CMYK color conversion table (c) of the destination (S3).

That is, the B2A table computation unit 324 acquires a color conversion table in which a device value (CMYK value) is associated with the colorimetric value (L*a*b* value) of the printer 1 to be subjected to color conversion. The B2A table computation unit 324 may refer to the B2A table of the printer profile stored in the storage unit 3f or the like to acquire such table. The B2A table includes CMYK values corresponding to 333 colors generated by combinations of colors in the XYZ or L*a*b* color space.

When the printer profile does not exist in the storage unit 3f, the B2A table computation unit 324 creates the B2A table from an A2B table by first creating the A2B table as described above. In this case, out-of-gamut mapping needs to be performed on an input point outside the color gamut of the printer 1.

Next, the input point computation unit 331 of the device link profile computation unit 33 acquires an L*a*b* value (d) as the colorimetric value to be subjected to color conversion (S4). When the device link profile is created, the colorimetric value is computed for one of a plurality of combinations of CMYK values (such as 214 colors) by the interpolation computation using the CMYK-L*a*b* color conversion table (a) of the target. The plurality of combinations of CMYK values corresponds to the CMYK value (C, M, Y, K) as the input device value illustrated in FIG. 4.

Next, the interpolation-purpose grid computation unit 332 computes a grid group (e) in the L*a*b*-CMYK color conversion table (c) and a weight (f) that are required in converting the L*a*b* value (d) to be subjected to color conversion into the CMYK value (S5).

That is, the interpolation-purpose grid computation unit 332 performs an interpolation operation on the L*a*b* value (d) to be subjected to color conversion by using the L*a*b*-CMYK color conversion table (c) of the printer 1 and computes the L*a*b* value as the grid group (e) and the weight (f) that are used in computing the CMYK value. The number of grids vary depending on the interpolation method used where, as the grid group, four points of coordinates are computed in triangular pyramid interpolation while eight points of coordinates are computed in cubic interpolation, for example.

Next, the color gamut determination unit 333 acquires inside/outside color gamut information of the grid group (e) computed by the interpolation-purpose grid computation unit 332 and determines whether to use the L*a*b*-CMYK color conversion table (c) in computing the device value (S6).

The inside/outside color gamut information is information indicating whether the colorimetric value (L*a*b* value) of each grid included in the grid group (e) is inside or outside the color gamut of the printer 1 (CMYK). The color gamut determination unit 333 determines whether or not the L*a*b*-CMYK color conversion table (c) can be used depending on whether each colorimetric value of the grid group (e) is inside or outside the color gamut of the printer 1, and then sets a flag of the determination result. The flag is set (ON) when the L*a*b*-CMYK color conversion table (c) is used, whereas the flag is not set (OFF) when the color conversion table (c) is not used. Details of the processing performed in step S6 being a sub-routine will be described later with reference to FIGS. 8 and 9.

Next, it is determined whether or not the flag of the determination result made in step S6 is set ON (S7).

When the flag of the determination result is ON (YES in S7), the B2A computation unit 334 uses the L*a*b*-CMYK color conversion table (c) of the printer 1 to perform the interpolation computation. When the flag of the determination result is OFF (NO in S7), on the other hand, the A2B computation unit 335 computes the CMYK value directly by using the CMYK-L*a*b* color conversion table (b) of the printer 1. The device link profile computation unit 33 switches the processing that computes the device value (CMYK value) in this manner according to ON/OFF of the flag of the determination result. Specifically, the switching is performed as follows.

When the flag of the determination result is ON in step S7 (YES in S7), the B2A computation unit 334 uses the L*a*b*-CMYK color conversion table (c) as well as the grid group (e) and the weight (f) to compute the CMYK value corresponding to the L*a*b* value to be subjected to color conversion (S8). The B2A computation unit 334 computes the CMYK value by adding each grid that is weighted.

When the flag of the determination result is OFF in step S7 (NO in S7), the A2B computation unit 335 uses the CMYK-L*a*b* color conversion table (b) to compute the CMYK value corresponding to the L*a*b* value to be subjected to color conversion (S9). Details of the processing performed in step S9 being a sub-routine will be described later with reference to FIG. 10.

The CMYK value computed in steps S8 and S9 corresponds to the CMYK value (C, M, Y, K)' as the output device value illustrated in FIG. 4.

Next, the device link profile computation unit 33 (input point computation unit 331) determines whether the color conversion processing is completed on all the input points (all combinations of the CMYK values) (S10). When creating the color conversion table, the device link profile computation unit 33 repeats the processing in each of steps S4 to S10 until computation on all the input points is completed. Once the computation on all the input points is completed, the color conversion table is saved in a predetermined location (file or memory space) in the storage unit 3f.

According to the flowchart illustrated in FIG. 7, as described above, the device value (CMYK value) corresponding to the L*a*b* value to be subjected to color conversion is computed by performing inverse conversion with use of the CMYK-L*a*b* color conversion table (b), when it is determined to not use the L*a*b*-CMYK color conversion table (c) on the basis of the inside/outside color gamut information of the grid group (NO in S7). When it is determined to use the L*a*b*-CMYK color conversion table (c) on the basis of the inside/outside color gamut information of the grid group (YES in S7), on the other hand, the device value (CMYK value) corresponding to the L*a*b* value to be subjected to color conversion is computed from the L*a*b*-CMYK color conversion table (c) upon performing the interpolation computation with use of each grid being weighted.

(Example of Processing that Determines Whether or not to Use L*a*b*-CMYK Color Conversion Table)

Next, an example of the processing performed in step S6 to determine whether or not to use the L*a*b*-CMYK color conversion table (c) will be described with reference to FIG. 8.

Figure 8:
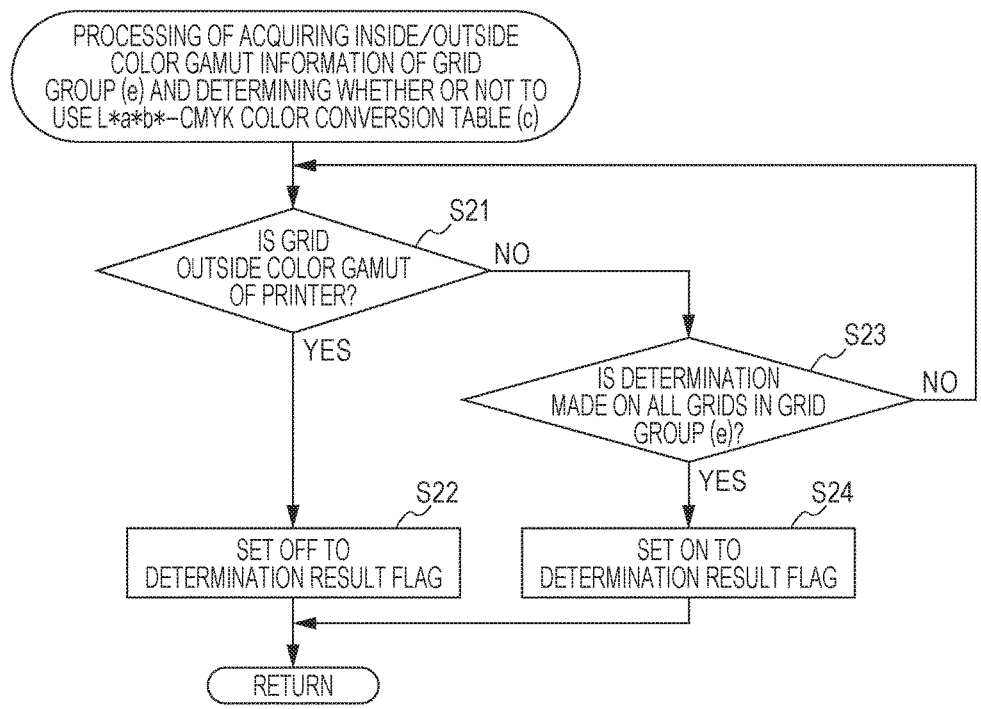
FIG. 8 is a flowchart illustrating an example of processing that determines whether or not to use a color conversion table to convert L*a*b* into CMYK, according to an embodiment of the present invention.

FIG. 8 is a flowchart illustrating an example of the processing that determines whether or not to use the color conversion table (c) used to convert the L*a*b* value into the CMYK value. FIG. 8 illustrates an example where the flag of the determination result is set OFF (B2A table is not used) when at least one grid point used in the interpolation computation is outside the color gamut of the printer 1.

The color gamut determination unit 333 first determines whether the grid in the grid group (e) used in the interpolation computation is outside the color gamut of the printer 1 (S21). The flag of the determination result is set OFF by the color gamut determination unit 333 (S22) when the grid is determined to be outside the color gamut of the printer 1 (YES in S21).

When the grid is determined to not be outside the color gamut of the printer 1 (NO in S21), on the other hand, the color gamut determination unit 333 determines whether determination processing is performed on all the grids in the grid group (e) (S23).

When it is determined that the determination processing is not performed on all the grids (NO in S23), the color gamut determination unit 333 returns to the determination processing in step S21 and determines whether a next grid is outside the color gamut. The flag of the determination result is set ON by the color gamut determination unit 333 (S24) once the determination processing is performed on all the grids (YES in S23).

Following the processing in step S22 or S24, the color gamut determination unit 333 returns to the main flowchart in FIG. 7 and executes the processing in step S7.

All the grid points (four or eight points) used in the interpolation computation are determined to be inside or outside the color gamut of the printer 1 as described above. Then, the flag of the determination result is set OFF when at least one grid point used in the interpolation computation is outside the color gamut of the printer 1, whereby the L*a*b*-CMYK color conversion table (c) (B2A table) is not used.

When the ICC profile is used, color gamut information called a gamut tag (indicating whether each input point in the B2A table is inside or outside the color gamut) may be used to determine whether or not the grid is outside the color gamut of the printer 1. Moreover, when the gamut tag does not exist, it may be adapted to form a polyhedron (polygon information) from the color gamut of the printer 1 configured by the A2B table of the printer 1 and determine whether a corresponding colorimetric value is inside or outside the polyhedron in the color space.

(Another Example of Processing that Determines Whether or not to Use L*a*b*-CMYK Color Conversion Table)

Next, another example of the processing performed in step S6 to determine whether or not to use the L*a*b*-CMYK color conversion table (c) will be described with reference to FIG. 9.

Figure 9:
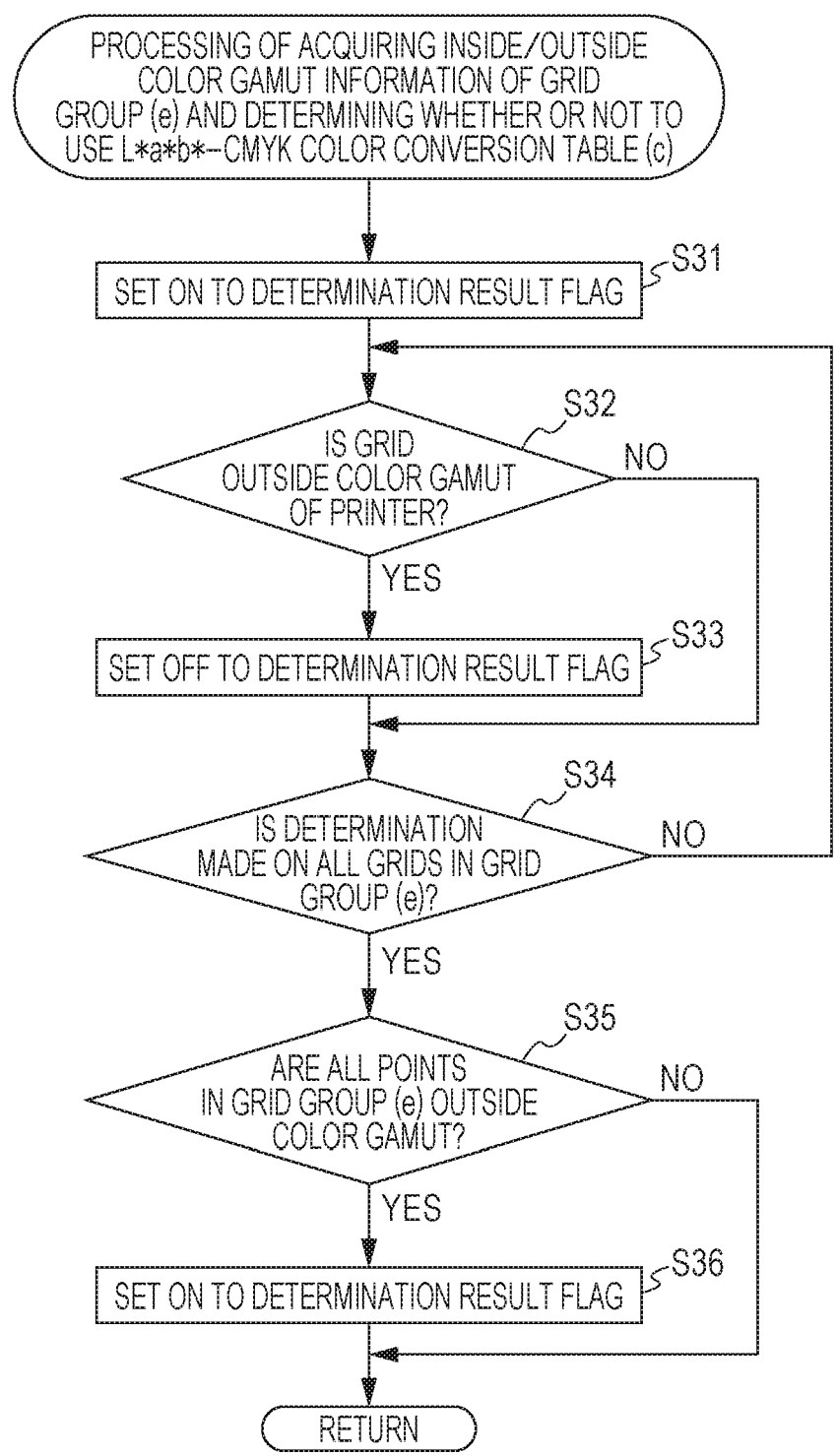
FIG. 9 is a flowchart illustrating another example of the processing that determines whether or not to use the color conversion table to convert L*a*b* into CMYK, according to an embodiment of the present invention.

FIG. 9 is a flowchart illustrating another example of the processing that determines whether or not to use the color conversion table (c) used to convert the L*a*b* value into the CMYK value.

First, the flag of the determination result is set ON by the color gamut determination unit 333 (S31).

Next, the color gamut determination unit 333 determines whether the grid in the grid group (e) used in the interpolation computation is outside the color gamut of the printer 1 (S32). The flag of the determination result is set OFF by the color gamut determination unit 333 (S33) when the grid is determined to be outside the color gamut of the printer 1 (YES in S32).

On the other hand, the color gamut determination unit 333 proceeds to step S34 when the grid is determined to not be outside the color gamut of the printer 1 (NO in S32).

Following the processing in step S33 or when it is determined NO in step S32, the color gamut determination unit 333 determines whether the determination processing is performed on all the grids in the grid group (e) (S34).

When it is determined that the determination processing is not performed on all the grids (NO in S34), the color gamut determination unit 333 returns to the determination processing in step S32 and determines whether a next grid is outside the color gamut.

Once the determination processing is performed on all the grids (YES in S34), the color gamut determination unit 333 determines whether all the grids in the grid group (e) are outside the color gamut of the printer 1 (S35). The color gamut determination unit 333 returns to the main flowchart in FIG. 7 and executes the processing in step S7 when it is determined that not all the grids are outside the color gamut of the printer 1 (NO in S35).

The flag of the determination result is set ON by the color gamut determination unit 333 (S36) when all the grids in the grid group (e) are determined to be outside the color gamut of the printer 1 (YES in S35). Following the processing in step S36, the color gamut determination unit 333 returns to the main flowchart in FIG. 7.

According to the aforementioned processing in FIG. 9, the CMYK value corresponding to the L*a*b* value to be subjected to color conversion is computed by performing inverse conversion with use of the CMYK-L*a*b* color conversion table (b), when at least one grid included in the grid group (e) is outside the color gamut (excluding the case where all the grids are outside the color gamut). On the contrary, when all the grids included in the grid group (e) are inside or outside the color gamut, the CMYK value corresponding to the L*a*b* value to be subjected to color conversion is computed by performing the interpolation computation with use of the grid included in the grid group (e) in the L*a*b*-CMYK table (c) and the weight.

Similar to the example illustrated in FIG. 8, the flag of the determination result is set OFF (B2A table is not used) when at least one grid point used in the interpolation computation is outside the color gamut of the printer 1. Note, however, that the flag of the determination result is set ON (B2A table is used) when all the grids are outside the color gamut. That is, the flag of the determination result is set OFF when the grid group is both inside and outside the color gamut of the printer 1. When all the grids used in the interpolation computation are outside the color gamut of the printer 1, the colorimetric value to be subjected to color conversion is mapped onto the surface of the color gamut of the printer 1 so that the interpolation computation does not cause the problem of color gamut compression. As a result, the B2A table can be used when all the grids used in the interpolation computation are outside the color gamut.

The out-of-gamut mapping involves high processing load. However, according to the determination processing illustrated in FIG. 9, the B2A table is used when all the grids used in the interpolation computation are outside the color gamut of the printer 1, in which case the out-of-gamut mapping is not performed. The determination processing illustrated in FIG. 9 therefore has an advantage of being able to cut the computation time compared to the determination processing illustrated in FIG. 8.

(Method of Computing CMYK Value by Using CMYK-L*a*b* Color Conversion Table)

Figure 10:
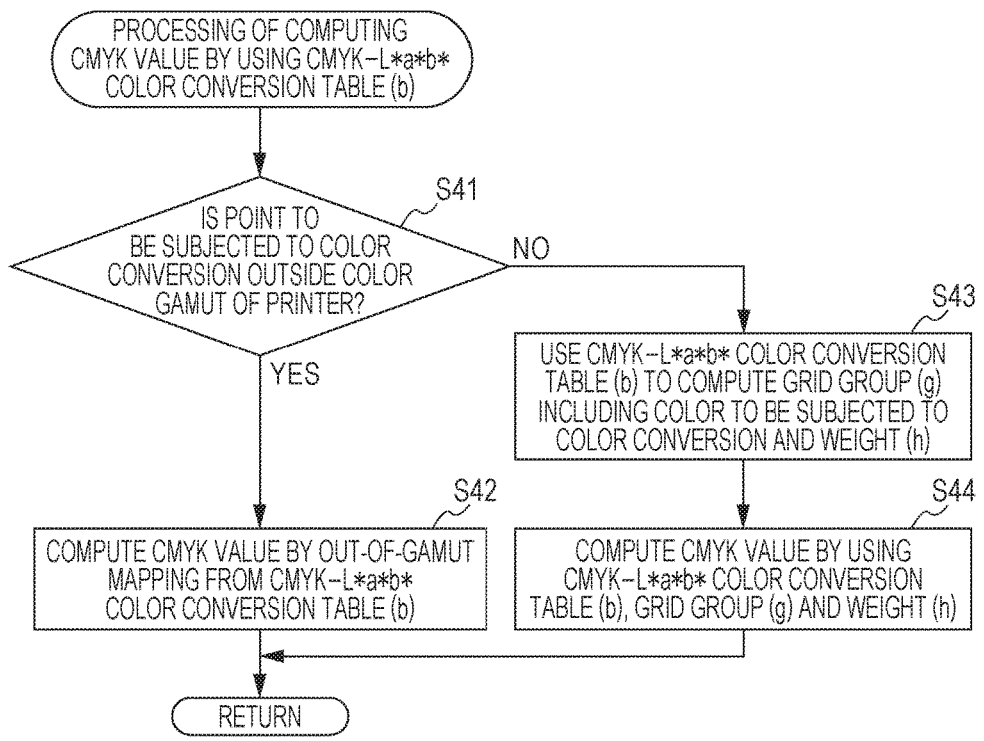
FIG. 10 is a flowchart illustrating a method of computing a value of CMYK by using a color conversion table used to convert CMYK into L*a*b*.

FIG. 10 is a flowchart illustrating a method of computing a value of CMYK by using the color conversion table (b) used to convert the CMYK value into the L*a*b* value.

The color gamut determination unit 333 first determines whether or not the colorimetric value (L*a*b* value) to be subjected to color conversion is outside the color gamut of the printer 1 (S41).

Next, when the colorimetric value (L*a*b* value) to be subjected to color conversion is determined to be outside the color gamut of the printer 1 in the determination processing in step S41 (YES in S41), the A2B computation unit 335 uses the CMYK-L*a*b* color conversion table (b) to compute the CMYK value corresponding to the L*a*b* value to be subjected to color conversion by out-of-gamut mapping (S42).

On the other hand, when the colorimetric value (L*a*b* value) to be subjected to color conversion is determined to not be outside the color gamut of the printer 1 in the determination processing in step S41 (NO in S41), the A2B computation unit 335 uses the CMYK-L*a*b* color conversion table (b) to compute a grid group (g) including the L*a*b* value to be subjected to color conversion and a weight (h) of each grid (S43).

Next, the A2B computation unit 335 performs the interpolation computation by using the grid included in the grid group (g) in the CMYK-L*a*b* color conversion table (b) and the weight (h), and computes the CMYK value corresponding to the L*a*b* value to be subjected to color conversion (S44).

Following the processing in step S42 or S44, the processing returns to the main flowchart in FIG. 7 so that the determination processing in step S10 is executed.

As has been described with reference to FIG. 10, the CMYK value corresponding to the L*a*b* value to be subjected to color conversion is directly computed from the A2B table of the printer 1. At this time, known out-of-gamut mapping or a gamut mapping technique is used when the color (L*a*b* value) to be subjected to color conversion is outside the color gamut of the printer 1.

When the method of computing the CMYK value of the printer 1 on the basis of the L*a*b* value to be subjected to color conversion is performed to correspond with the creation of the B2A table by the printer profile acquisition unit 32 of the printer 1, the boundary between the method of using the B2A table and the method of computing the CMYK value directly from the A2B table is better linked.

The technique of deriving the CMYK value corresponding to the L*a*b* value to be subjected to color conversion is a known technique (refer to paragraphs [0049] to [0061] and, regarding out-of-gamut mapping, FIG. 17 and the description provided therefor in JP 2011-254224 A, for example).

According to the present embodiment having the aforementioned configuration, it is determined whether or not the grid group used in performing color conversion on the colorimetric value to be subjected to color conversion is outside the color gamut of the device such as the printer 1, thereby switching the color conversion computation according to the determination result.

That is, the color conversion table is used when the grid within the color gamut of the device is used in the interpolation computation. On the other hand, when the grid outside the color gamut of the device is used in the interpolation computation, the computation is directly executed by using color characteristic information (CMYK value) of the device without using the color conversion table to thus be able to reproduce the ideal point Id on the color gamut surface and prevent a loss in the color gamut of the output device. As a result, the whole color gamut of the device can be fully used in an effective manner in the color management system.

2. Variation

While the color conversion table creation device 3 executes software for profile computation to create the color conversion table (device link profile) in the aforementioned embodiment, the controller 2 may be adapted to create the color conversion table as well.

The printer 1 being the CMYK printer in the aforementioned example may also be an RGB printer.

While the printer 1 is provided as an example of the image forming apparatus, the present invention can also be applied to another image forming apparatus such as an electrophotographic printer, an inkjet printer, or an offset printing machine.

Furthermore, the device-independent color space being the L*a*b* in the aforementioned example may also be XYZ or CIE CAM 02.

There has been described the embodiments to which the invention devised by the present inventors is applied. However, the present invention is not to be limited by the description and drawings forming a part of the disclosed invention implemented by the aforementioned embodiments, where various modifications can be made without departing from the scope of the invention described in claims.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A color conversion method comprising:
   a first acquisition step of acquiring a first color conversion table which defines mapping from a first color space to a second color space, and a second color conversion table which defines mapping from the second color space to a third color space of an output device;
   a second acquisition step of acquiring a color in the second color space to be subjected to color conversion from the first color conversion table;
   a computation step of computing an element group and a weight of each element included in the element group that are required to compute a color in the third color space of the output device corresponding to the color in the second color space to be subjected to the color conversion and acquired in the first acquisition step, the element group including as an element the color in the second color space in the second color conversion table;
   a determination step of determining whether or not at least one element, but not all elements, included in the element group is outside a color gamut of the output device; and
   a processing step of performing, when a determination result obtained in the determination step is that the at least one element, but not all elements, included in the element group is outside the color gamut of the output device, a first processing of performing inverse conversion by using the first color conversion table and computing the color in the third color space of the output device corresponding to the color in the second color space to be subjected to the color conversion, and when the determination result is that all elements included in the element group are inside or outside the color gamut of the output device, second processing of performing an interpolation computation by using the element group and the weight of each element computed in the computation step and computing the color in the third color space of the output device corresponding to the color in the second color space to be subjected to the color conversion.

2. The color conversion method according to claim 1 wherein, the second processing is performed when all elements included in the element group are determined to be inside the color gamut.

3. The color conversion method according to claim 1 wherein, when the element group in the second color conversion table required to compute a color in the first color space includes an element that is outside the color gamut of the output device, out-of-gamut mapping is performed to map a corresponding element onto a surface of the color gamut.

4. A non-transitory recording medium storing a computer readable program that causes a computer to execute the steps of:
   acquiring a first color conversion table which defines mapping from a first color space to a second color space, and a second color conversion table which defines mapping from the second color space to a third color space of an output device;
   acquiring a color in the second color space to be subjected to color conversion from the first color conversion table;
   computing an element group and a weight of each element included in the element group that are required to compute a color in the third color space of the output device corresponding to the color in the second color space to be subjected to the color conversion, the element group including as an element the color in the second color space in the second color conversion table;
   determining whether or not at least one element, but not all elements, included in the element group is outside a color gamut of the output device; and
   performing, when a result of the determination is that the at least one element, but not all elements, included in the element group is outside the color gamut of the output device, a first processing of performing inverse conversion by using the first color conversion table and computing the color in the third color space of the output device corresponding to the color in the second color space to be subjected to the color conversion, and when the determination result is that all elements included in the element group are inside or outside the color gamut of the output device, second processing of performing an interpolation computation by using the element group and the weight of each element and computing the color in the third color space of the output device corresponding to the color in the second color space to be subjected to the color conversion.

5. An image processing apparatus comprising:
   a hardware processor configured to:
   acquire a first color conversion table which defines mapping from a first color space to a second color space;
   acquire a second color conversion table which defines mapping from the second color space to a third color space of an output device;
   acquire a color in the second color space to be subjected to color conversion from the first color conversion table;

compute an element group and a weight of each element included in the element group that are required to compute a color in the third color space of the output device corresponding to the acquired color in the second color space, the element group including as an element the color in the second color space in the second color conversion table;

determine whether or not at least one element, but not all elements, included in the element group is outside a color gamut of the output device;

perform, when a result of the determination is that the at least one element, but not all elements, included in the element group is outside the color gamut of the output device, inverse conversion by using the first color conversion table and compute the color in the third color space of the output device corresponding to the color in the second color space to be subjected to the color conversion when the result of the determination is that element group is outside the color gamut of the output device;

perform, when the result of the determination is that all elements included in the element group are inside or outside the color gamut of the output device, an interpolation computation by using the element group and the weight of each element and compute the color in the third color space of the output device corresponding to the color in the second color space to be subjected to the color conversion; and create a color conversion table by associating the color in the third color space of the output device that is output from either the inverse conversion or the interpolation computation according to the result of the determination and corresponds to the color in the second color space to be subjected to the color conversion, and a color in the first color space that is acquired from the first color conversion table and corresponds to the color in the second color space to be subjected to the color conversion.

6. The non-transitory recording medium according to claim 4 wherein, the second processing is performed when all elements included in the element group are determined to be inside the color gamut.

7. The non-transitory recording medium according to claim 4 wherein, when the element group in the second color conversion table required to compute a color in the first color space includes an element that is outside the color gamut of the output device, out-of-gamut mapping is performed to map a corresponding element onto a surface of the color gamut.

8. The image processing apparatus according to claim 5, wherein, the second processing is performed when all elements included in the element group are determined to be inside the color gamut.

9. The image processing apparatus according to claim 5, wherein, when the element group in the second color conversion table required to compute a color in the first color space includes an element that is outside the color gamut of the output device, out-of-gamut mapping is performed to map a corresponding element onto a surface of the color gamut.

* * * * *